(No Model.)

G. P. MITCHELL.
BREAD PAN.

No. 431,909. Patented July 8, 1890.

Attest:
E. P. Britton
F. A. Watson

Inventor:
George P. Mitchell
By E. B. Whitmore, Atty.

United States Patent Office.

GEORGE PERRY MITCHELL, OF NEWARK, NEW YORK, ASSIGNOR OF TWO-THIRDS TO JOHN E. STUART AND DANIEL A. PYATT, OF SAME PLACE.

BREAD-PAN.

SPECIFICATION forming part of Letters Patent No. 431,909, dated July 8, 1890.

Application filed February 21, 1889. Serial No. 300,728. (No model.)

*To all whom it may concern:*

Be it known that I, GEORGE PERRY MITCHELL, of Newark, in the county of Wayne and State of New York, have invented a new and useful Improvement in Bread-Pans, which improvement is fully set forth in the following specification, and shown in the accompanying drawings.

The object of my invention is to produce a convenient device upon which to cut bread, cake, heads of cabbage, or other substances for the table that are liable to crumble or break into fragments while being cut, the invention being hereinafter fully described, and particularly pointed out in the claim.

Figure 1:
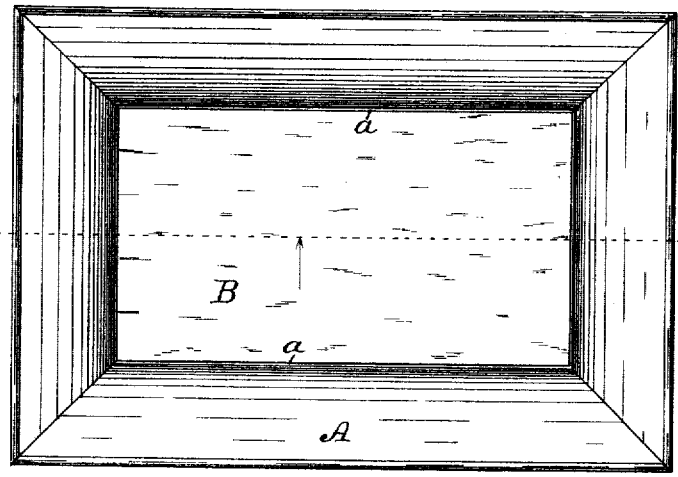
Figure 2:
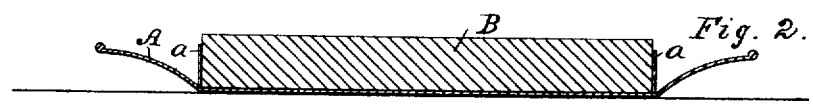
Figure 3:
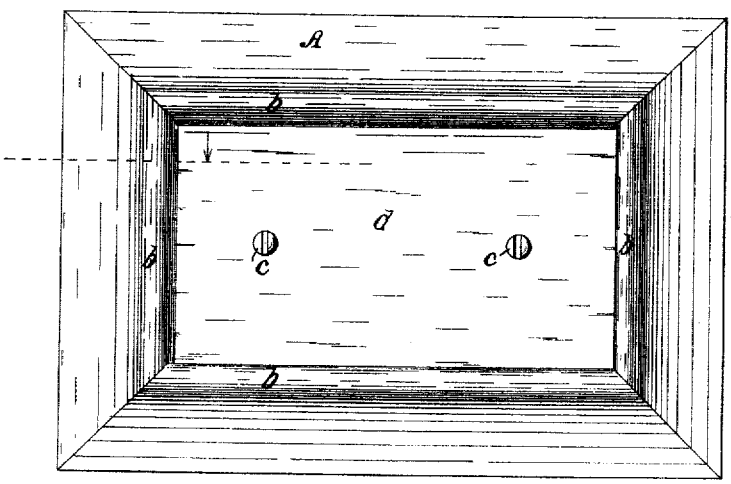

Referring to the drawings, Figure 1 is a plan of my improved bread-pan, and Fig. 2 a longitudinal section on the dotted line in Fig. 1. Fig. 3 is a bottom view of a modified form of the device, and Fig. 4 a longitudinal section taken on the dotted line in Fig. 3. Fig. 5 shows a second simple modification in the construction of the device.

Referring to the parts shown in the drawings, A is a pan or tray, preferably rectangular in form, made of sheet metal, paper, vulcanized rubber, sheets of wood, or any convenient material, and B a center cutting-board, preferably of wood. This cutting-board is made to stand higher than the surrounding edges of the pan, so that the edge of the knife used for cutting the bread shall not be dulled thereon in case the pan is made of metal; also, to the end that the edges of the pan shall not be marred by the knife should the former be made of wood or other soft material. The pan is larger in horizontal dimensions than the cutting-board, there being a marginal area of the pan around the edge of said cutting-board, so that the crumbs or pieces falling from the material being cut are caught by the pan, so that no litter is made during the operation.

As shown in Figs. 1 and 2, the cutting-board is centered and held to place by an upwardly-projecting flange $a$, reaching upward from the interior of the pan about to the level of the edges of the pan.

Figure 4:
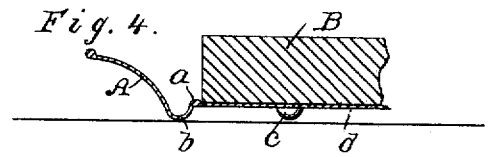
Figure 5:
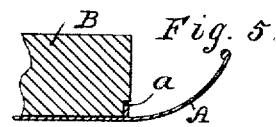

Figs. 3 and 4 show the pan constructed with a foot $b$ at its under surface to rest upon the table, with a depressed panel $d$ at the middle. In this form of the device the flange $a$ is preferably made very low and in the form of a bead, as shown, screws $c$ of common kind being employed to hold the board to place.

In the construction shown in Fig. 5 the flange or retainer $a$ is lower than that shown in Fig. 2 and the cutting-board is rabbeted out to receive the flange. In this form the cutting-board overhangs the flange all around and crumbs are prevented from getting between the flange and the board. In this form the board is held to the pan by friction between it and the flange, as in the form shown in Fig. 2; or, if found necessary, simple fastening devices, as screws, may be employed to hold the board to place.

What I claim as my invention is—

A pan upon which to cut bread, formed with a flange within its edge or periphery, leaving a margin of the pan without said flange, the latter being lower than the outer edge of the pan, in combination with a cutting-board in the space within said flange and reaching above the outer edge or periphery of the pan, substantially as shown, and for the purpose set forth.

GEORGE PERRY MITCHELL.

Witnesses:
E. K. BURNHAM,
MILTON SMITH.